Figure 1:
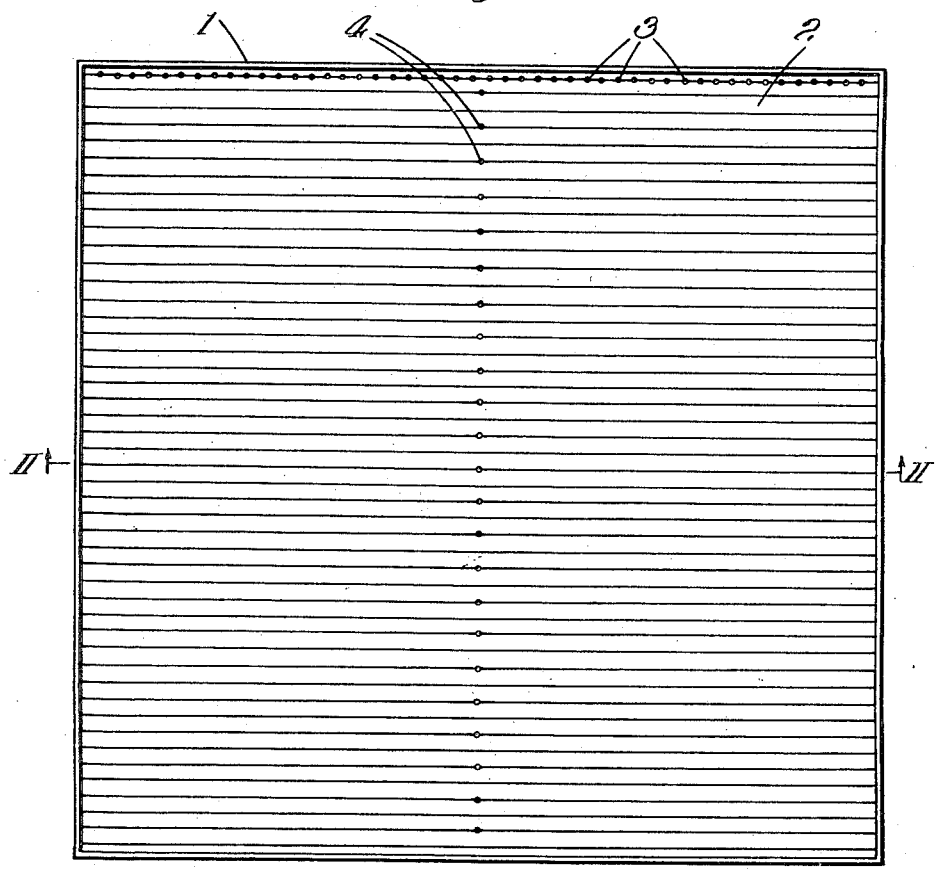

Nov. 14, 1939.   H. H. B. LUND   2,179,642
APPARATUS FOR THE GERMINATION OF SEEDS AND THE GROWTH OF SEEDLINGS
Filed July 6, 1937

INVENTOR:
HENRY HILTON BLAIR LUND
BY Haseltine, Lake & Co.
ATTORNEYS

Patented Nov. 14, 1939

2,179,642

UNITED STATES PATENT OFFICE 2,179,642

APPARATUS FOR THE GERMINATION OF SEEDS AND THE GROWTH OF SEEDLINGS

Henry Hilton Blair Lund, Welwyn Garden City, England

Application July 6, 1937, Serial No. 152,266
In Great Britain July 6, 1936

6 Claims. (Cl. 47—1.2)

This invention relates to apparatus for the germination of seeds and the growth of seedlngs for human food, fodder and the like, and is concerned with the provision of a soilless cultivation cabinet of the type consisting of a closed cabinet having means for heating the interior of the cabinet to a desired temperature, and having internally arranged trays for the reception of seeds or seedlings, there being means for supplying a fertilizer liquid to the trays.

Various arrangements have been proopsed for causing the fertilizer liquid to be fed into the trays containing the seeds or seedlings, and in the specification of my copending patent application Serial No. 132,055 now Patent 2,169,701, there is described a cultivation cabinet in which the liquid is sprinkled onto the trays, the trays being grouped one above the other, and being individually such that the liquid sprayed onto the uppermost tray may percolate therethrough and enter the trays below successively. In order to allow the liquid to percolate through the trays, in the specification of my prior application I have described the trays as being formed with apertures along the tops or apices of the corrugations in the trays. It is found in practice that although it is desirable that the fertilizer liquid should collect in the bottoms or valleys of the corrugations, the collecting of the liquid in this way for an indefinite period tends to cause the liquid to stagnate with the result that the crop becomes affected and mould is liable to set in.

It is the chief object of the invention, therefore, to overcome the tendency for the fertilizer liquid to collect and stagnate in the valleys of the corrugations in the trays.

According to the invention a corrugated tray in, or for use in, a cultivation cabinet of the type referred to, has, in addition to the apertures formed along the apices of the corrugations that permit fairly rapid passage of the liquid, one or more apertures fomed in the valleys of the corrugations, to allow liquid collected therein to drain slowly away. It will be appreciated that in the apices of the corrugations a large number of apertures are formed, so that the sprinkled liquid may pass through a tray reasonably quickly. By the arrangement of, for example, a single aperture in the valley of the corrugation, the liquid collecting in such valley may, for example, be arranged to drain away in about three hours.

Figure 2:
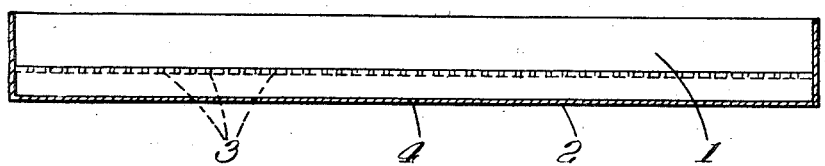

In order that the invention may be clearly understood and readily carried into effect, the same will now be described more fully with reference to the accompanying drawing, in which:

Figure 1 is a plan view of a tray formed in accordance with the invention, only a single row of the apertures in the apices of the corrugations being shown, and Figure 2 is a section on the line II—II of Figure 1.

The tray, as shown, consists of a rectangular side framing 1 and a corrugated bottom plate 2. Along the apices of the corrugations, apertures 3 are formed, as described in the specification of my co-pending patent application Serial No. 132,055. In the chosen example illustrated, a single aperture 4 is located in each corrugation valley. The aperture 4 is, in this example, of one-eighth of an inch diameter, while the distance between the adjacent apices of the corrugations is one inch, and the angle between the corrugations is substantially 60°. There may be twenty-four of the corrugations to the complete tray, the length of the tray in the direction along the corrugations being two feet. The apertures 3 are situated one half-inch apart, and are of one-eighth of an inch diameter.

With the dimensions indicated, it is found that when seeds or seedlings are present in the tray, liquid sprayed upon the tray passes fairly rapidly therethrough by virtue of the apertures 3, but some liquid collects in the valleys of the corrugations and takes about three hours to escape through the valley apertures 4. The root development of a crop produced in this way is found to be very good, and by reason of the fact that only a few apertures are formed in the valleys of the corrugations, the finished crop is easily removed from a tray since the roots tend to remain in the valleys of the corrugations where the liquid is only slowly drained off, and while as there are comparatively few of the apertures 4, any root growth tending to pass through these apertures, does not cause difficulty in removing the crop as a whole.

It will be appreciated that the dimensions of trays formed in accordance with the invention may be varied, the essential factor being, however, that the apertures in the apices of the corrugations should allow the liquid falling upon the tray to percolate fairly quickly, whilst the apertures in the valleys of the corrugations should allow the liquid to remain for a greater period of time, but preferably not more than three hours.

It will be appreciated that the tray instead of having straight continuous corrugations might have corrugations which follow sinuous or curved paths or, in other words, the corrugations might be made of various patterns so long as there are raised and low portions in which the apertures can be formed. The dimensions indicated above might still then be used, there being the one-eighth inch apertures spaced one half inch apart in the apices of the corrugations, and a single-one-eighth inch aperture located in the valley between each pair of corrugations for each two-foot run of the corrugations as measured along the curved or sinuous path followed by the corrugations.

What I claim and desire to secure by Letters Patent of the United States is:

1. In a soil-less cultivation apparatus including a closed cabinet having means for producing a downflow of fertiliser liquid within the same and means for receiving trays intended to contain seeds or seedlings so as to allow the trays to be grouped one below the other beneath the liquid downflow, the feature which consists of a seed or seedling containing tray comprising a horizontal bottom member and corrugations formed in said bottom member to constitute valleys and apices, there being a plurality of apertures formed along the apices of the corrugations to permit fairly rapid passage of the fertiliser liquid through the tray, and there being at least one aperture formed in each valley of the corrugations between the apices of the same and among the apertures upon said apices in order that liquids collecting therein may slowly escape therefrom.

2. In a soil-less cultivation apparatus including a closed cabinet having means for producing a downflow of fertiliser liquid within the same and means for receiving trays intended to contain seeds or seedlings so as to allow the trays to be grouped one below the other beneath the liquid downflow, the feature which consists of a seed or seedling containing tray comprising a horizontal bottom member, corrugations formed in said member, to constitute valleys and apices therein, there being a plurality of apertures formed along said apices, and there being at least one aperture formed in each valley of the corrugations between the apices of the same and among the apertures upon said apices, said apertures in the apices permitting fairly rapid passage of fertiliser liquid therethrough, but the apertures of the valleys being dimensioned, in relation to the corrugations when the tray is in use, to cause liquid introduced onto the tray to collect in the corrugations and escape through the apertures in the valleys in a period of time substantially not exceeding three hours.

3. In a soil-less cultivation apparatus including a closed cabinet having means for producing a downflow of fertiliser liquid within the same and means for receiving trays intended to contain seeds or seedlings so as to allow the trays to be grouped one below the other beneath the liquid downflow, a seed or seedling containing tray comprising a horizontal bottom member, and corrugations formed in said member to constitute apices and valleys therein, there being a single aperture of substantially $\frac{1}{8}''$ diameter formed in the valley of each corrugation for every two-foot length of tray as measured along the corrugations thereof, and there being a plurality of apertures in the apices of the corrugations, each of which is of substantially $\frac{1}{8}''$ diameter, said single aperture in each valley being located between and among the apertures of the apices.

4. In a soil-less cultivation apparatus including a closed cabinet having means for producing a downflow of fertiliser liquid within the same and means for receiving trays intended to contain seeds or seedlings so as to allow the trays to be grouped one below the other beneath the liquid downflow, the feature which consists of a seed or seedling containing tray comprising a horizontal bottom member, and corrugations formed in said member to constitute apices and valleys therein, there being a single aperture of substantially $\frac{1}{8}''$ diameter formed in the valley of each corrugation for every two-foot length of tray as measured along the corrugations thereof, and there being a plurality of apertures in the apices of the corrugations, each of which is of substantially $\frac{1}{8}''$ diameter, being spaced apart by approximately $\frac{1}{2}''$, said single aperture in each valley being located between and among the apertures of the apices.

5. A normally horizontal seed or seedling tray forming one of a series adapted to be disposed one above the other in a closed cabinet and within the same exposed to a downflow of nutrient liquid, said tray comprising a substantially horizontal sheet material member which is corrugated to form alternate apices and channels or valleys upon substantially the whole of its active area, the apices each being pierced by a plurality of apertures within the limits of said active area, and said channels or valleys each being pierced within the same active area by a relatively fewer number of apertures than that of any adjacent corrugation apex.

6. A normally horizontal seed or seedling tray forming one of a series adapted to be disposed one above the other in a closed cabinet and within the same exposed to a downflow of nutrient liquid, said tray comprising a substantially horizontal sheet material member which is corrugated to form alternate apices and channels or valleys upon substantially the whole of its active area, the apices each being pierced by a plurality of apertures within the limits of said active area, and said channels or valleys each being pierced by a single aperture within the limits of the same active area.

HENRY HILTON BLAIR LUND.